United States Patent
Komatsu et al.

(10) Patent No.: US 11,074,681 B2
(45) Date of Patent: Jul. 27, 2021

(54) ANOMALOUSNESS DETERMINATION METHOD, ANOMALOUSNESS DETERMINATION APPARATUS, AND COMPUTER-READABLE RECORDING MEDIUM

(71) Applicants: FUJITSU LIMITED, Kawasaki (JP); RIKEN, Wako (JP); SHOWA UNIVERSITY, Tokyo (JP); NATIONAL CANCER CENTER, Tokyo (JP)

(72) Inventors: Masaaki Komatsu, Koto (JP); Hiroyuki Yoshida, Machida (JP); Akira Sakai, Kawasaki (JP); Akihiko Sekizawa, Shinagawa (JP); Ryu Matsuoka, Shinagawa (JP); Ryuji Hamamoto, Chuo (JP)

(73) Assignees: FUJITSU LIMITED, Kawasaki (JP); RIKEN, Wako (JP); SHOWA UNIVERSITY, Shinagawa (JP); NATIONAL CANCER CENTER, Chuo (JP)

( * ) Notice: Subject to any disclaimer, the term of this patent is extended or adjusted under 35 U.S.C. 154(b) by 98 days.

(21) Appl. No.: 16/546,304

(22) Filed: Aug. 21, 2019

(65) Prior Publication Data
US 2020/0065954 A1    Feb. 27, 2020

(30) Foreign Application Priority Data
Aug. 24, 2018 (JP) ............... JP2018-157841

(51) Int. Cl.
*G06T 7/00* (2017.01)
*G06K 9/00* (2006.01)

(52) U.S. Cl.
CPC ........ *G06T 7/0002* (2013.01); *G06K 9/00201* (2013.01); *G06T 2207/10132* (2013.01)

(58) Field of Classification Search
None
See application file for complete search history.

(56) References Cited

U.S. PATENT DOCUMENTS

2017/0024883 A1*   1/2017   Urabe ............... A61B 8/463

OTHER PUBLICATIONS

Sadeghi et al., "30Hz Object Detection with DPM V5", Sep. 6-12, 2014, pp. 1-16.
Redmon et al., "You Only Look Once: Unified, Real-Time Object Detection", May 9, 2016, pp. 1-10.

* cited by examiner

*Primary Examiner* — Leon Flores
(74) *Attorney, Agent, or Firm* — Xsensus LLP

(57) ABSTRACT

A non-transitory computer-readable recording medium storing therein an anomalousness determination program that causes a computer to execute a process includes: sensing a region in an object in each of a plurality of ultrasound examination images using an object sensing technique; based on a result of the sensing and a structure of the object, acquiring a result of sensing each of a plurality of regions in the object in each of the ultrasound examination images; and determining anomalousness in the object based on the result of sensing each of the regions in the ultrasound examination images.

11 Claims, 11 Drawing Sheets

FIG.6
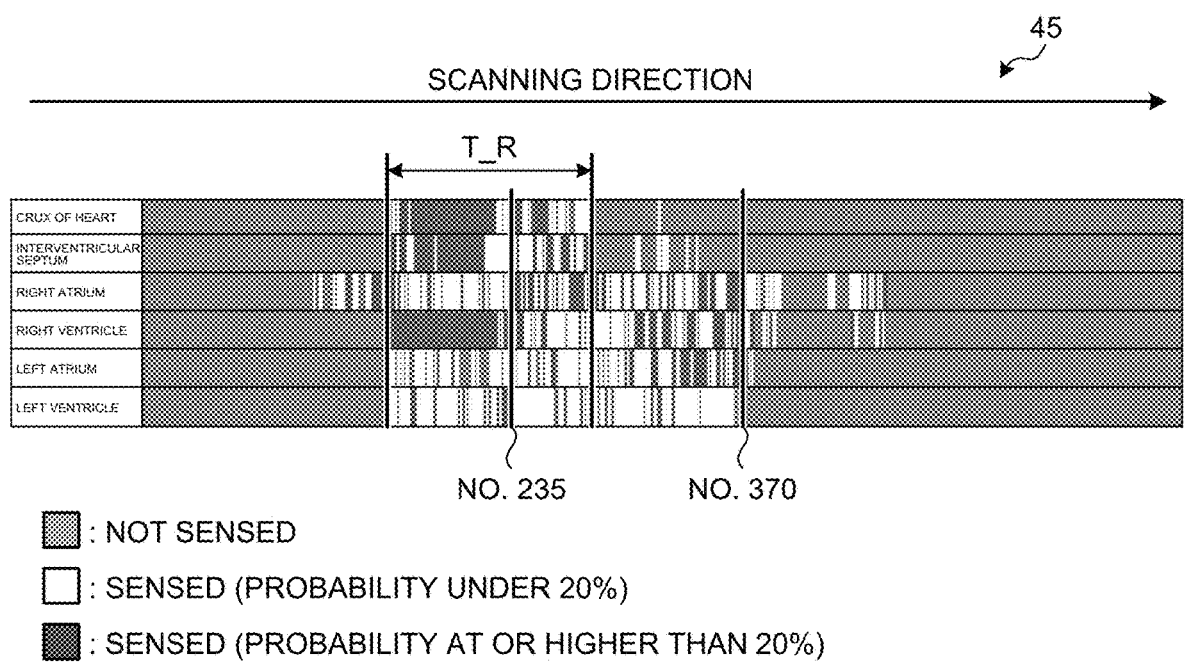
NO. 235   NO. 370
▨ : NOT SENSED
☐ : SENSED (PROBABILITY UNDER 20%)
▨ : SENSED (PROBABILITY AT OR HIGHER THAN 20%)
FIG.7
NO. 235
NO. 370

NO. 235

NO. 131

▨ : NOT SENSED

☐ : SENSED (PROBABILITY UNDER 20%)

▨ : SENSED (PROBABILITY AT OR HIGHER THAN 20%)

NO. 131

NO. 131

ANOMALOUSNESS DETERMINATION METHOD, ANOMALOUSNESS DETERMINATION APPARATUS, AND COMPUTER-READABLE RECORDING MEDIUM

CROSS-REFERENCE TO RELATED APPLICATION(S)

This application is based upon and claims the benefit of priority of the prior Japanese Patent Application No. 2018-157841, filed on Aug. 24, 2018, the entire contents of which are incorporated herein by reference.

FIELD

The embodiments discussed herein are related to an anomalousness determination method, an anomalousness determination apparatus, and a computer-readable recording medium.

BACKGROUND

Ultrasound examination to examine whether there is anomalousness in an internal structure without destroying a subject has been known. In ultrasound examination, for example, two-dimensional scan cross-sectional images of a subject to be examined are captured and the cross-sectional images are checked to examine the subject. The scan cross-sectional images are strongly influenced by change in imaging environments because a probe used for imaging is caused to perform scanning by a person. For this reason, scan cross-sectional images, that is, ultrasound examination images are often checked by sight.

Furthermore, object sensing techniques to sense what object is imaged in an image have been known. For object sensing techniques, for example, DPM (Deformable Parts Model) and YOLO (You Only Look Once) have been proposed as methods of sensing an object in an image by machine learning.

Non-Patent Document 1: M. A. Sadeghi and D. Forsyth, "30 Hz Object Detection with PM V5", In Computer Vision-ECCV 2014, pages 65-79, Springer, 2014

Non-Patent Document 2: Joseph Redmon, Santosh Divvala, Ross Girshick, Ali Farhadi, "You Only Look Once: Unified, Real-Time Object Detection", arXiv:1506.02640v5 [cs.CV], 9 May 2016

When anomalousness in an object is to be sensed using anomalousness sensing technique with an auto encoder, or the like, on an ultrasound examination image, a difference in the background, or the like, may be sensed as anomalousness because of a low image resolution and a great change in imaging environments. Thus, it is difficult to perform anomalousness determination on an internal structure.

SUMMARY

According to an aspect of an embodiment, a non-transitory computer-readable recording medium stores therein an anomalousness determination program that causes a computer to execute a process including: sensing a region in an object in each of a plurality of ultrasound examination images using an object sensing technique; based on a result of the sensing and a structure of the object, acquiring a result of sensing each of a plurality of regions in the object in each of the ultrasound examination images; and determining anomalousness in the object based on the result of sensing each of the regions in the ultrasound examination images.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating another exemplary region sensing map;

FIG. 7 is a diagram illustrating exemplary ultrasound examination images;

DESCRIPTION OF EMBODIMENT(S)

Preferred embodiments will be explained with reference to accompanying drawings. Note that the embodiments do not limit the disclosed technology. The following embodiments may be combined as appropriate as long as no inconsistency is caused.

[a] First Embodiment

Figure 1:
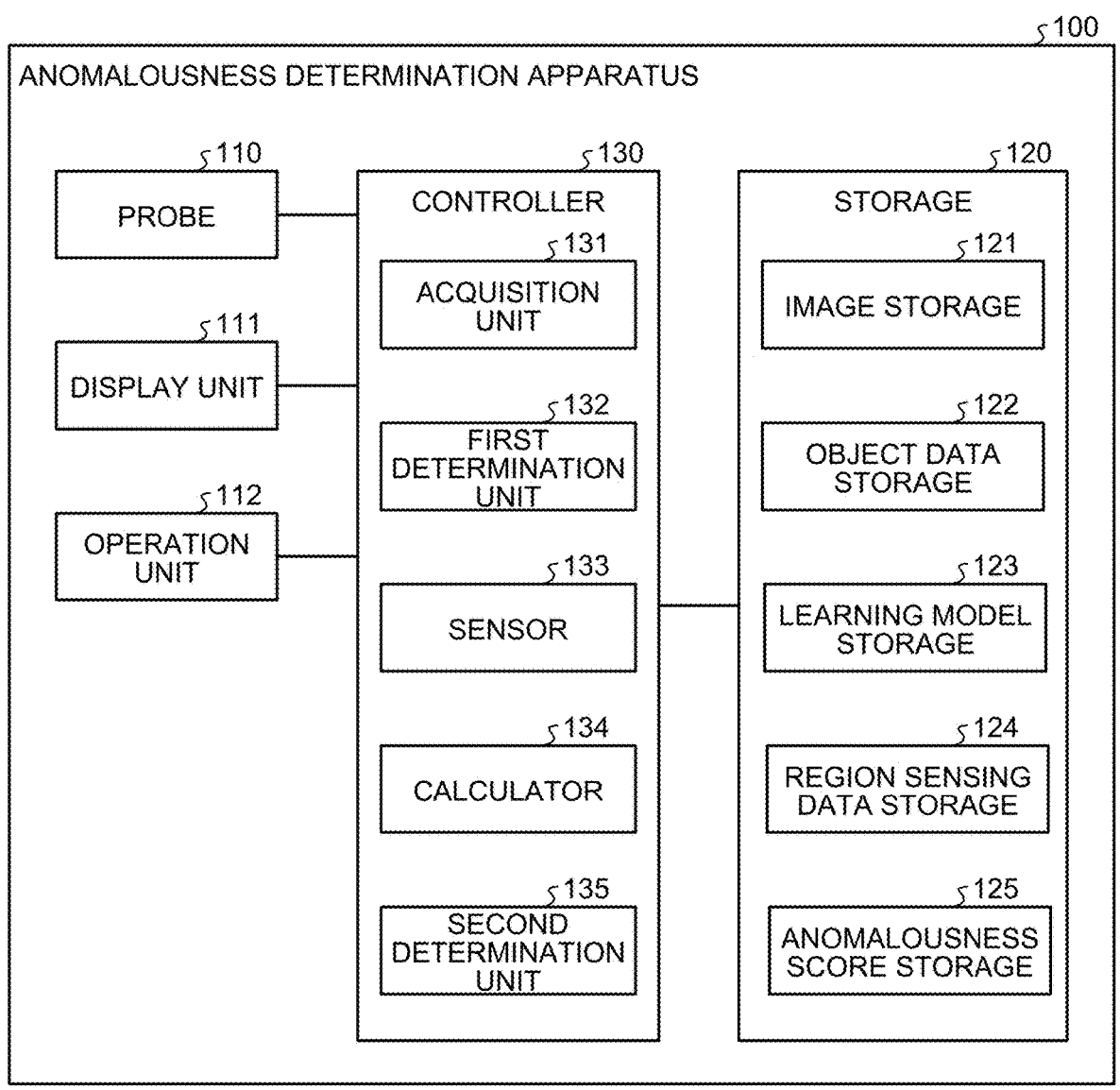
FIG. 1 is a block diagram illustrating an exemplary configuration of an anomalousness determination apparatus of a first embodiment.

FIG. 1 is a block diagram illustrating an exemplary configuration of an anomalousness determination apparatus of a first embodiment. An anomalousness determination apparatus 100 that is illustrated in FIG. 1 is an exemplary information processing apparatus that performs anomalousness determination with respect to an object having a known structure using a plurality of ultrasound examination images of the object. The anomalousness determination apparatus 100 senses regions in the object in each of the ultrasound examination images using an object sensing technique. Based on the result of sensing and the structures of the object, the anomalousness determination apparatus 100 acquires a result of sensing each of a plurality of regions in the object in each of the ultrasound examination images. Based on the result of sensing each of the regions in the ultrasound examination images, the anomalousness determination apparatus 100 determines anomalousness in the object. Accordingly, the anomalousness determination apparatus 100 is able to perform anomalousness determination based on the result of the ultrasound examination images.

Figure 2:
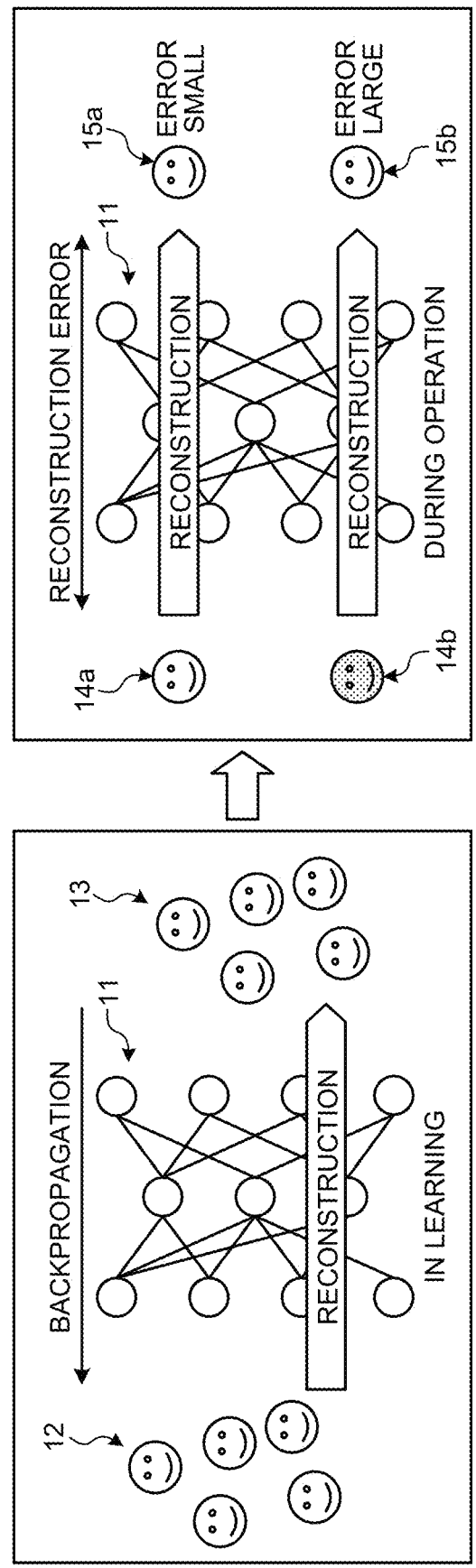
FIG. 2 is a diagram illustrating sensing of anomalousness by an auto encoder.

First of all, using FIG. 2, anomalousness sensing using deep learning will be described. When there are plenty of anomalousness examples as training data, it is possible to learn a learning model that discriminates normality and anomalousness using a standard supervised learning method by deep learning; however, as for the anomalousness sensing issue, normally, there are plenty of only normality examples and there are very few anomalousness examples or there is no anomalousness example. Thus, for anomalousness sensing, an auto encoder that is an exemplary unsupervised learning method is used. FIG. 2 is a diagram illustrating exemplary anomalousness sensing by an auto encoder. The example in FIG. 2 is the case where an auto encoder is used for anomalousness sensing. In learning by the auto encoder, when normal input images 12 are input to a learning model 11, the input images 12 are given as supervisory data. In other words, the learning model 11 learns such that output images 13 that are approximately the same as the normal input images 12 can be reconstructed. On the other hand, during operation, for example, an input image 14a and an output image 15a are compared with each other and a reconstruction error is calculated. When the value of reconstruction error is small as in the output image 15a, normality can be determined. On the other hand, when an input image 14b containing an anomalous value is input to the learning model 11, the value of a reconstruction error between the input image 14b and an output image 15b increases and accordingly anomalousness can be sensed. Note that, when anomalousness sensing is performed on a video, the value of reconstruction error is determined per frame.

As such anomalousness sensing, anomalousness sensing in welding and anomalous event sensing with a monitoring camera (learning temporal regularity in video sequences) can be exemplified. Furthermore, sensing in which video data is divided into cubes, an anomalousness level in each of the cubes is determined, the anomalousness level is superimposed onto the video, and the video with the anomalousness level is displayed is exemplified. In those example, the background does not move and thus it is possible to perform anomalousness sensing with an auto encoder.

Anomalousness sensing using an auto encoder like that illustrated in FIG. 2 is sensitive to noise, which causes a lot of false sensing in ultrasound examination images with low image resolution. In the anomalousness sensing, the whole input image is to be compared, that is, a part to be noted is not be specified, which causes a lot of false sensing occurs when the background changes because of change in imaging environments. Learning by the learning model 11 requests a lot of normality data.

Imagine a scene where ultrasound examination is performed. An object that is a subject to be examined often has a uniform internal structure. For this reason, in ultrasound examination, it is possible to estimate a structure that is supposed to originally exist from information, such as the position of a probe, using findings in the examination, a design, etc. In the embodiment, it is determined whether there is anomalousness in the subject to be examined whose internal structure in a normal state is represented by comparing the internal structure that is sensed by an object sensing technique using machine learning and a normal structure that is supposed to originally exist. Object sensing techniques using machine learning has not reached human standards (average accuracy of mAP=approximately 80); however, sufficiently reliable results can be calculated by statistically processing the processing results. In the embodiment, the heart of a fetus is exemplarily described as a subject to be examined, and the examination is applicable to other internal organs.

Figure 3:
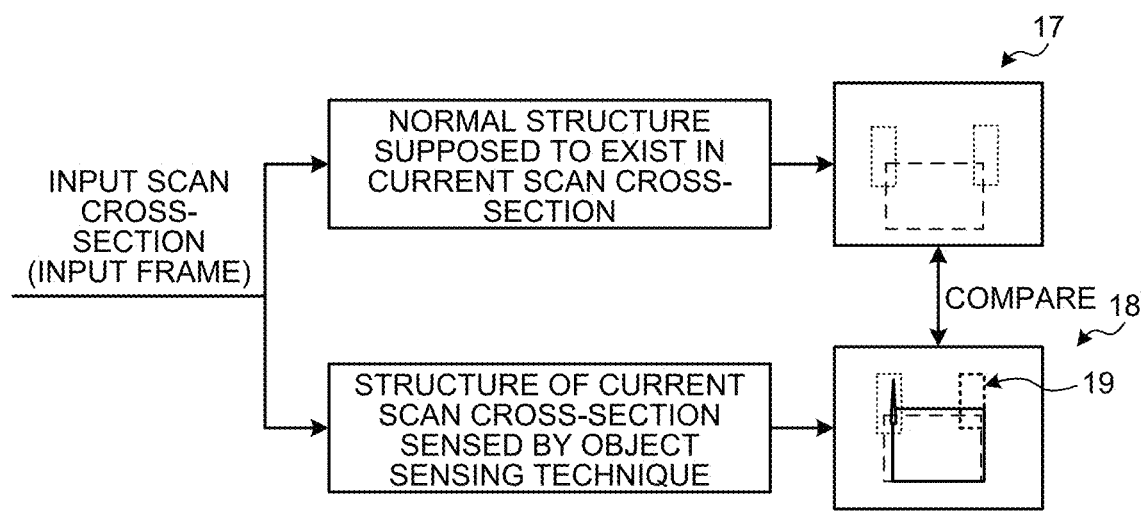
FIG. 3 is a diagram illustrating exemplary anomalousness determination.

FIG. 3 is a diagram illustrating exemplary anomalousness determination. As illustrated in FIG. 3, for an input scan cross-section (input frame) in ultrasound examination, a normal structure 17 supposed to exist in the current scan cross-section and a structure 18 of the current cross-section that is sensed by the object sensing technique are compared with each other. As a result of comparison, when there is a defect part 19 in the structure 18, it can be determined that there is anomalousness. Note that the normal structure 17 may be input in advance manually or may be estimated and calculated from an image of an input frame, positional information, etc.

A configuration of the anomalousness determination apparatus 100 will be described. As illustrated in FIG. 1, the anomalousness determination apparatus 100 includes a probe 110, a display unit 111, an operation unit 112, a storage 120, and a controller 130. The anomalousness determination apparatus 100 may include, in addition to the functional units illustrated in FIG. 1, various functional units of a known computer, for example, function units, such as various input devices and sound output devices.

The probe 110 is an exemplary probe that applies ultrasound to the subject to be examined and that receives the ultrasound that is reflected from the inside of the subject to be examined. For the probe 110, for example, various probes including a linear-type, convex-type, and sector-type probes can be used. For the probe 110, for example, ultrasound of frequencies of approximately 2 MHz to 20 MHz can be used. The probe 110 outputs reception data to the controller 130.

The display unit 111 is a display device for displaying various types of information. The display unit 111 is achieved using a liquid crystal display, or the like, as a display device. The display unit 111 displays various screens including a display screen that is input from the controller 130.

The operation unit 112 is an input device that accepts various operations from a user of the anomalousness determination apparatus 100. The operation unit 112 is achieved using, for example, a keyboard, a mouse, etc., as the input device. The operation unit 112 outputs an operation that is input by the user as operation information to the controller 130. The operation unit 112 may be achieved using a touch panel, etc., as an input device, and the display device of the display unit 111 and the input device of the operation unit 112 may be integrated with each other.

The storage 120 is achieved using, for example, a semiconductor memory device, such as a random access memory (RAM) or a flash memory, or a storage device, such as a hard disk or an optical disk. The storage 120 includes an image storage 121, an object data storage 122, a learning model storage 123, a region sensing data storage 124, and an anomalousness score storage 125. The storage 120 stores information that is used for the process performed by the controller 130.

The image storage 121 stores a plurality of ultrasound examination images that are generated based on the reception data that is input from the probe 110. The ultrasound examination images can be, for example, a video having a plurality of frame. In the following description, a plurality of ultrasound examination images may be represented as a video and an image of one frame of a video may be represented as an examination image.

The object data storage 122 stores object data representing a structure of an object that is a subject to be examined. For the object data, for example, a rule-based data that is estimated using the current position of the probe 110 and a relationship between sequential frames is usable. For the object data, data based on a three-dimensional model based on a manual input and a design may be used. In other words, the object data can be represented as a set of regions R_t that are supposed to be imaged in an examination image m_t at a time t. Accordingly, in the following description, the set of regions R_t that are supposed to be imaged in the examination image m_t at the time t is also expressed as object data R_t. A section of the time t corresponding to the examination image m_t with the object data R_t therein is represented by a time set T_R and a set of examination images m_t corresponding to the time set T_R are represented by all examination images M. In other words, the object data storage 122 stores the time set T_R together with the object data R_t.

The learning model storage 123 stores, for the object that is the subject to be examined, a learning model that has learned a plurality of elements h relating to a structure H of the object. The learning model is obtained by learning each element h of the structure H of the object previously according to an object sensing algorithm, such as YOLO, SSD (Single Shot MultiBox Detector) or Faster-RNN (Recurrent Neural Network). The learning model stores, for example, various parameters (weighting coefficients) of the neural network, etc.

The region sensing data storage 124 stores region sensing data on each of the examination images m_t that is data obtained by sensing each element h of the structure H of the object using the learning model. The region sensing data can be represented as a set D_t of the regions (elements h) imaged in the examination image m_t at the time t. Accordingly, in the following description, the set of the regions D_t imaged in the examination image m_t at the time t is also represented as the region sensing data D_t.

The anomalousness score storage 125 stores an anomalousness score of all examination images M corresponding to the time set T_R, which is a score that is calculated based on the object data R_t and the region sensing data D_t. Note that the object data R_t corresponding to the time set T_R is represented as object data R and the region sensing data D_t corresponding to the time set T_R is represented as region sensing data D.

The controller 130 is achieved by, for example, a central processing unit (CPU), a micro processing unit (MPU), or the like by executing a program that is stored in an internal storage device using the RAM as a work area. The controller 130 may be achieved using, for example, an integrated circuit, such as an application specific integrated circuit (ASIC) or a field programmable gate array (FPGA). The controller 130 includes an acquisition unit 131, a first determination unit 132, a sensor 133, a calculator 134, and a second determination unit 135 and achieve or execute functions and effects of the image processing described below. The internal configuration of the controller 130 is not limited to the configuration illustrated in FIG. 1 and another configuration may be used as long as the configuration enables information processing described below.

When an instruction to start acquiring a video is issued to the acquisition unit 131, the acquisition unit 131 starts acquiring reception data from the probe 110. The acquisition unit 131 starts generating a video based on the acquired reception data. In other words, the acquisition unit 131 starts acquiring a video. An examination image based on the reception data is obtained by calculating a distance from a time after application of ultrasound until return of the reflected ultrasound and various examination images, such as B-mode, M-mode, and color-doppler images, can be used. When there is a part where the scanning direction returns because of move of the fetus, or the like, in the acquired video, the frame of the return part is removed by comparing the frames of the video. The acquisition unit 131 stores the acquired video in the image storage 121 and outputs the video to the first determination unit 132.

Figure 4:
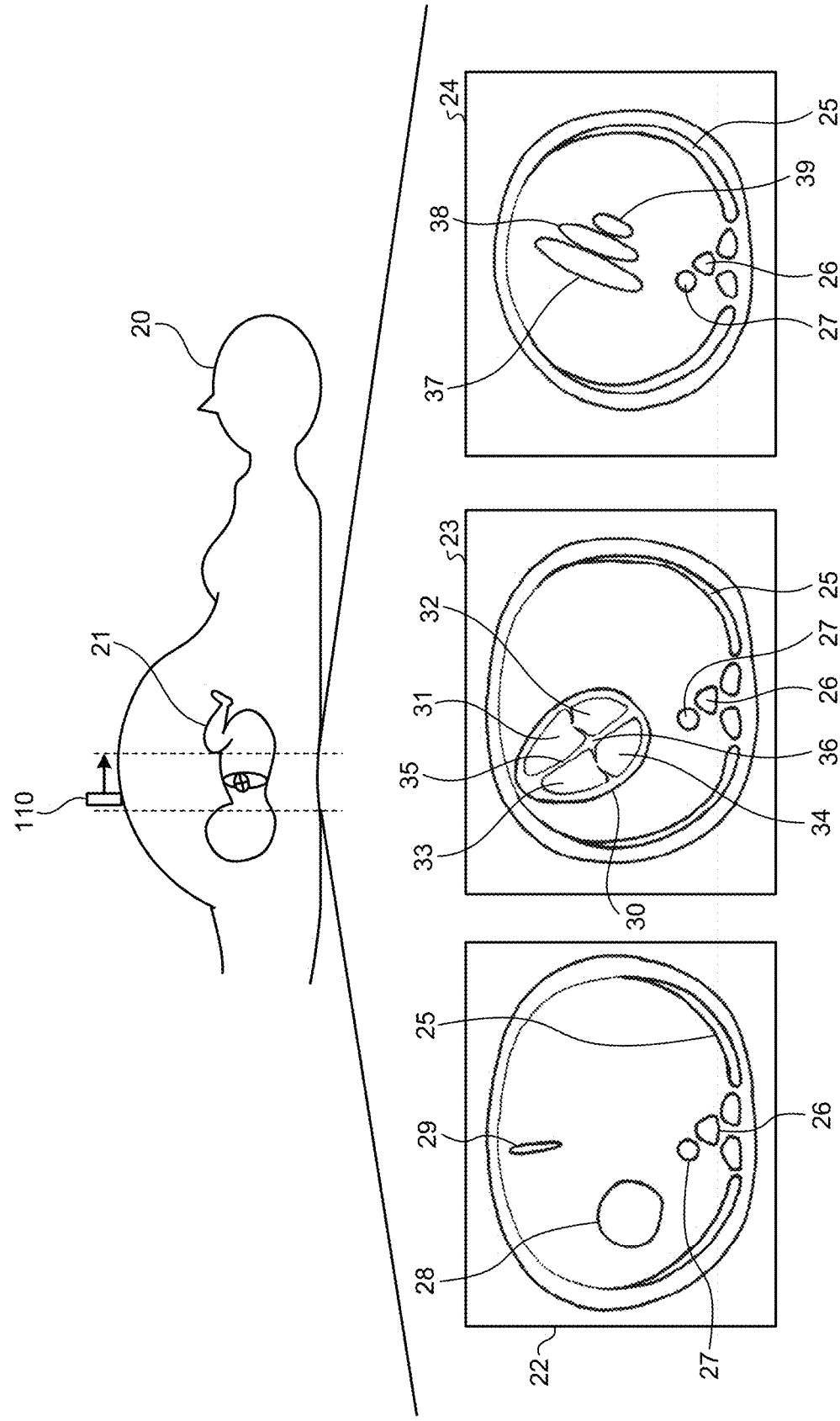
FIG. 4 is a diagram illustrating exemplary acquisition of an ultrasound examination image.

Using FIG. 4, acquisition of a video, that is, acquisition of a plurality of ultrasound examination images will be described. FIG. 4 is a diagram illustrating exemplary acquisition of ultrasound examination images. In the example in FIG. 4, examination images (ultrasound examination images) of a fetus 21 in a mother body 20 are acquired by scanning the abdomen of the mother body 20 with the probe 110. For example, a doctor sequentially scans from the stomach of the fetus 21 to the upper part of the heart. Exemplary examination images of the front and back of the heart are acquired as examination images in this case and examination images 22 to 24 are acquired as exemplary examination images of the heart. In the examination image 22, a costa 25, a spine 26, a descending aorta 27, a gastric cyst 28, and an umbilical vein 29 are imaged.

In the examination image 23, the costa 25, the spine 26, the descending aorta 27, and a heart 30 are imaged in the examination image 23. In the examination image 23, a right ventricle 31, a right atrium 32, a left ventricle 33, a left atrium 34, an interventricular septum 35, and a crux of heart 36 each of which is each region in the internal structure of the heart 30 are imaged. The heart 30 corresponds to the structure H of the object, that is, a set of cardiac components. The right ventricle 31, the right atrium 32, the left ventricle 33, the left atrium 34, the interventricular septum 35, and the crux of heart 36 correspond to each element h. In the examination image 24, the costa 25, the spine 26, the descending aorta 27, a pulmonary artery 37, an ascending aorta 38, and a superior vena cava 39 are imaged. In the embodiment, it is determined whether there is anomalousness in the heart by comparing object data R and region sensing data D with respect to the section (time set T_R) in which scanning is started and the heart is imaged in the examination image. Each region in the examination images 22 to 24 in FIG. 4 is clearly illustrated for explanation; however, in actual examination images, each region is not displayed clearly as in FIG. 4.

In other words, the ultrasound examination images are images obtained by scanning the object. Scanning by the probe 110 is performed in a single direction. The ultrasound examination images are images that are selected such that parts of return of the scanning are not contained.

Returning to description of FIG. 1, the first determination unit 132 determines whether a structure H (heart) of the object that is the subject to be examined is imaged in the examination image m_t. When the video is input from the acquisition unit 131, the first determination unit 132 extracts the examination image m_t of one frame from the input video. Utilizing strong pulsation of the heart, the first determination unit 132 calculates a score (rule score) corresponding to the pulsation using the following Equation (1). In other words, the first determination unit 132 calculates a score corresponding to the pulsation based on a difference between frames of the video.

$$(\text{rule\_score}) = \sum_{x,y} (m\_t(x, y) - m\_t(x, y))^2 \qquad (1)$$

In Equation (1), x denotes the vertical axis of the screen and y denotes the horizontal axis of the screen. Furthermore, m_t (x,y) denotes a pixel of a set of coordinates (x,y) of an examination image (frame) at a time t and the entire Equation (1) means that a sum of differences each between an examination image corresponding to a time prior to the time t by a time a and an examination image at the time t is calculated as a score. It can be determined that, the higher the score is, the greater the examination image changes over the time a, that is, the heart beats, and t' is a value of t−a, that is, obtained by subtracting a given difference a from t. The difference a is, for example, approximately "1 to 20" and is, for a video of 40 fps, approximately "1/40 second to 1/2 second" because the unit of time is 1/40 second.

The first determination unit 132 determines whether the calculated score exceeds a pre-set threshold k_r, thereby determining whether the structure H (heart) of the object that is the subject to be examined is imaged in the examination image m_t. The threshold k_r may be any value and, for example, a value of "3.0" can be used. When it is determined that the structure H (heart) of the object that is the subject to be examined is imaged in the examination image m_t, the first determination unit 132 calculates a set R_t of regions supposed to be imaged in the examination image m_t at the time t by the following Equation (2). On the other hand, when it is determined that the structure H (heart) of the object that is the subject to be examined is not imaged in the examination image m_t, the first determination unit 132 calculates object data R_t by the following Equation (3) (R_t=an empty set). Using Equation (2), object data R_t where the structure H of the object is imaged is calculated based on six elements h. Alternatively, the object data R_t may be calculated based on any number of elements h.

$$R\_t=\{\text{the right ventricle, the right atrium, the left ventricle, the left atrium, the interventricular septum, the crux of heart}\} \qquad (2)$$

$$R\_t=\emptyset \qquad (3)$$

When the object data R_t is calculated as Equation (2), the first determination unit 132 adds the time t to a time set T_R. The first determination unit 132 stores the calculated object data R_t and the time set T_R in the object data storage 122. The first determination unit 132 outputs the extracted examination image m_t to the sensor 133.

When an end determination instruction is input from the sensor 133, the first determination unit 132 determines whether the video has reached the end. In other words, the first determination unit 132 determines whether the extracted examination image m_t is the last frame of the video. When it is determined that the video has not reached the end, the first determination unit 132 increments the time t by one, extracts the next examination image m_t at the time t from the video, and repeats determination on whether the structure H (heart) of the object is imaged. On the other hand, when it is determined that the video has reached the end, the first determination unit 132 outputs a calculation instruction to the calculator 134.

In other words, the first determination unit 132 is an exemplary first determination unit that selects an examination image where a set of given regions is supposed to be imaged based on the change over time from multiple frames in the video containing the scan cross-section of the object. Furthermore, the selected examination image is output to the sensor 133 and the set object data R_t on the regions supposed to be imaged and the time set T_R are stored in the object data storage 122.

When the examination image m_t is input from the first determination unit 132, the sensor 133 refers to the learning model storage 123 and, for the input examination image m_t, senses each element h (region) of the structure H (heart) of the object using the learning model. In other words, the sensor 133 calculates region sensing data D_t that is a set D_t of the regions (elements h) imaged in the examination image m_t using the following Equation (4).

$$D\_t=\{h|P\_h(m\_t) \text{ is at or higher than a threshold } k\_d\} \qquad (4)$$

In Equation (4), P_h denotes probability of the position of an element h that is calculated when the element h is sensed using the learning model. The threshold k_d is a threshold for determining sensing of the element h with respect to the probability of the position of the element h. In other words, using Equation (4), the sensor 133 calculates, as region sensing data D_t, the result of sensing each element h (region) from the examination images m_t. The threshold k_d may be any value and, for example, a value of "3.0" may be used. By adjusting the threshold k_d, it is possible to set sensitivity of detection within a range from "complete loss of element" to "deviation from normal data". The sensor 133 stores the calculated region sensing data D_t in the region sensing data storage 124 and outputs the end determination instruction to the first determination unit 132.

In other words, the sensor 133 senses a region in the object in each of the ultrasound examination images that are selected by the first determination unit 132, using the object sensing technique. The sensor 133 is an exemplary recognition unit that performs object sensing for detecting the object from each of the frames, that is, image recognition. Furthermore, the sensor 133 calculates a degree at which the object is detected in image recognition (object sensing) in frames in which a change over time is detected from among the frames. The sensor 133 detects whether there is the object.

When a calculation instruction is input from the first determination unit 132 to the calculator 134, the calculator 134 refers to the object data storage 122 and acquires the time set T_R and the object data R corresponding to the time set T_R. The calculator 134 refers to the region sensing data storage 124 and acquires the region sensing data D corresponding to the time set T_R. Based on the time set T_R, the object data R and the region sensing data D, the calculator 134 calculates an anomalousness score using an anomalousness score calculation function A(R,T_R,D) represented in the following Equation (5).

$$A(R, T \ldots R, D) = \underset{t \in T \ldots R}{\text{mean}} \#(R \ldots t \backslash D \ldots t) \qquad (5)$$

In Equation (5), "\" denotes a set difference and "#" denotes the number of elements contained in the set. The time t belongs to the time set T_R and thus R_t denotes the object data R and D_t denotes the region sensing data D.

In other words, the calculator 134 calculates an anomalousness score of all examination images M corresponding to the time set T_R. The calculator 134 stores the calculated anomalousness score in the anomalousness score storage 125 and outputs an anomalousness determination instruction to the second determination unit 135.

In other words, the calculator 134 is an exemplary acquisition unit that acquires results of sensing the regions in the object in each of the ultrasound examination images based on the sensing result and the structure of the object.

When the anomalousness determination instruction is input to the second determination unit 135, the second determination unit 135 refers to the anomalousness score storage 125 and determines whether there is anomalousness based on the anomalousness score. In other words, the second determination unit 135 determines whether the anomalousness score A(R,T_D,D) exceeds a pre-set threshold k_A. The threshold k_A may be any value and, for example, a value of "3.0" can be used. When it is determined that the threshold k_A is not exceeded, the second determination unit 135 generates a determination result indicating that there is no anomalousness in the structure H (heart) of the object that is the subject to be examined. When it is determined that the threshold k_A is exceeded, the second determination unit 135 generates a determination result indicating that there is anomalousness in the structure H (heart) of the object that is the subject to be examined. The second determination unit 135, for example, outputs a screen based on the generated determination result and causes the display unit 111 to display the screen.

In other words, the second determination unit 135 is an exemplary determination unit that determines anomalousness in an object based on the result of sensing each of the regions in the ultrasound examination images. The second determination unit 135 determines anomalousness in the object based on the rate of detection of each of the regions in the ultrasound examination images (anomalousness score). The second determination unit 135 further determines anomalousness in the object based on whether there is the object. The second determination unit 135 is an exemplary second detector that detects anomalousness in the object based on the degree at which the object is detected in the image recognition (object sensing) in frames where change over time is detected from among the frames.

The second determination unit 135 may refer to the region sensing data storage 124 and generate, for the region sensing data D corresponding to the time set T_R, a region sensing map that displays the result of sensing in the scanning direction per region, output the region sensing map to the display unit 111, and cause the display unit 111 to display the region sensing map.

Figure 5:
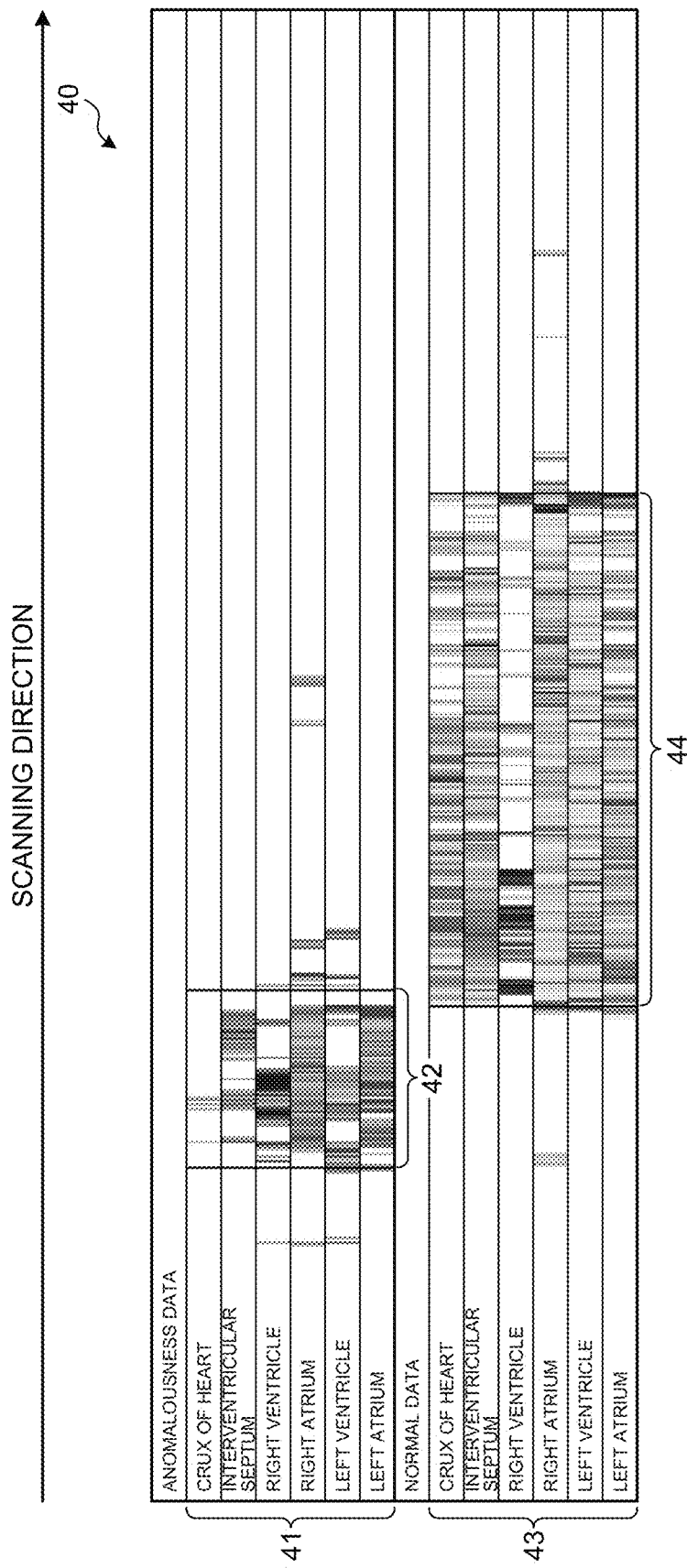
FIG. 5 is a diagram illustrating an exemplary region sensing map.

FIG. 5 is a diagram illustrating an exemplary region sensing map. The vertical axis of a region sensing map 40 illustrated in FIG. 5 represents elements h and the horizontal axis represents the time t and the region sensing map 40 represents probability of each region as a result of sensing in the scanning direction. In a section 42 where the heart is supposed to be imaged in an anomalousness example 41 in the region sensing map 40, for example, the probability is low in the region sensing data D_t on the crux of the heart and the area where sensing is not performed is large. On the other hand, in a section 44 where the heart is supposed to be imaged in a normal example 43, for example, the probability is high in the region sensing data D_t on the crux of the heart and correct sensing is performed. In other words, as illustrated in the region sensing map 40, the anomalousness determination apparatus 100 watches the ratio of the normality area and the anomalousness area and thus is able to determine anomalousness even when the anomalousness is unclear on the examination image.

FIG. 6 is a diagram illustrating another exemplary region sensing map. The vertical axis of a region sensing map 45 illustrated in FIG. 6 represents elements h and the horizontal axis represents the t and the region sensing map 45 represents probability of each region as a result of sensing in the scanning direction. The region sensing map 45 represents, for example, three steps of not-sensed, sensed (probability under 20%), and sensed (probability at or higher than 20%). The region sensing map 45 may represent not-sensed in gray and sensed (probability under 20%) and sensed (probability at or higher than 20%) in different colors, for example, white and blue. The cross-section of No. 235 will be extracted and an ultrasound examination image and a result of sensing regions will be described. As an exemplary area outside the area of the time set T_R, that is, an exemplary cross-section of a transition area, an ultrasound examination image of No. 370 is represented.

FIG. 7 is a diagram illustrating exemplary ultrasound examination images. FIG. 7 represents ultrasound examination images of the cross-sections of No. 235 and No. 370. The cross-section of No. 370 is the transition area and thus the interventricular septum 35 and the crux of heart 36 need not be imaged therein.

Figure 8:
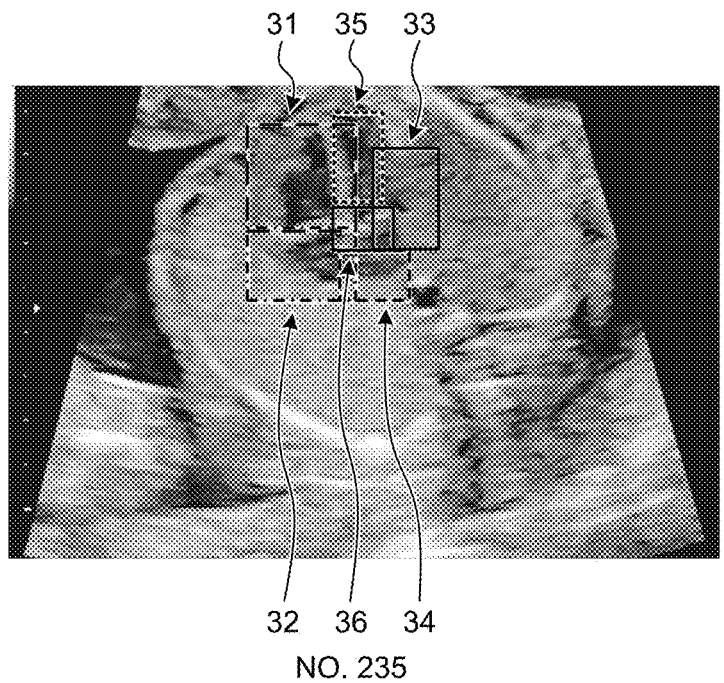
FIG. 8 is a diagram illustrating an exemplary result of sensing regions.

FIG. 8 is a diagram illustrating an exemplary result of sensing regions. FIG. 8 represents a result of sensing regions in No. 235 in FIG. 7. In No. 235, the right ventricle 31, the right atrium 32, the left ventricle 33, the left atrium 34, the interventricular septum 35, and the crux of heart 36 are sensed. The anomalousness determination apparatus 100 may display in real time frames of the result of sensing regions like those represented in FIG. 8 in the ultrasound examination image for monitoring that is displayed on the display unit 111 during scanning by the probe 110. The anomalousness determination apparatus 100 may display labels of names of the regions, etc., in the frames of the result of sensing the regions like those represented in FIG. 8.

Figure 9:
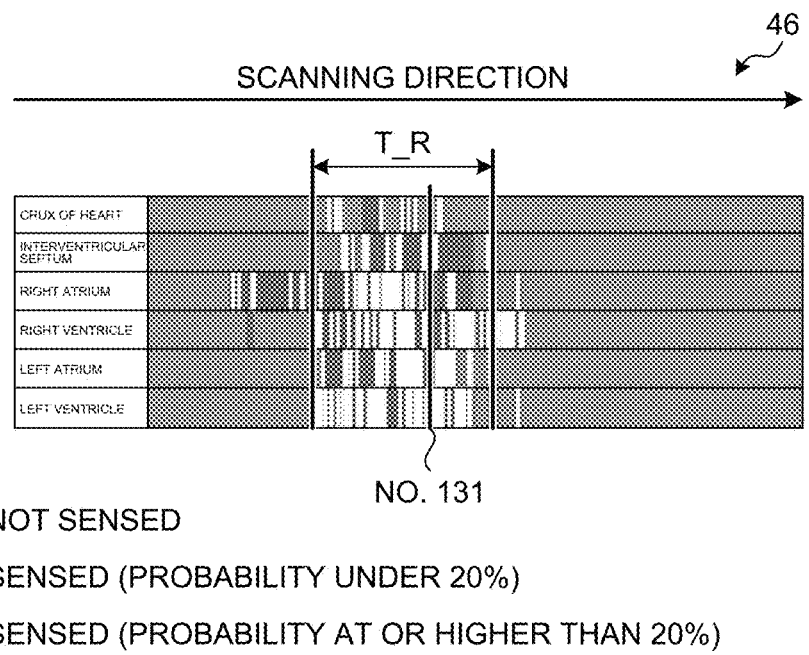
FIG. 9 is a diagram illustrating another exemplary region sensing map.

FIG. 9 is a diagram illustrating another exemplary region sensing map. As in the region sensing map 45 in FIG. 6, the vertical axis of a region sensing map 46 illustrated in FIG. 9 represents elements h and the horizontal axis represents the time t and the region sensing map 46 represents probability of each region as a result of sensing in the scanning direction. With the region sensing map 46, a defect of the crux of heart 36 can be read. A cross-section corresponding to the defect of the crux of heart 36 is, for example, No. 131.

Figure 10:
FIG. 10 is a diagram illustrating another exemplary ultrasound examination image.

FIG. 10 is a diagram illustrating another exemplary ultrasound examination image. FIG. 10 represents the ultrasound examination image corresponding to No. 131. No. 131 represents that the crux of heart 36 is lost.

Figure 11:
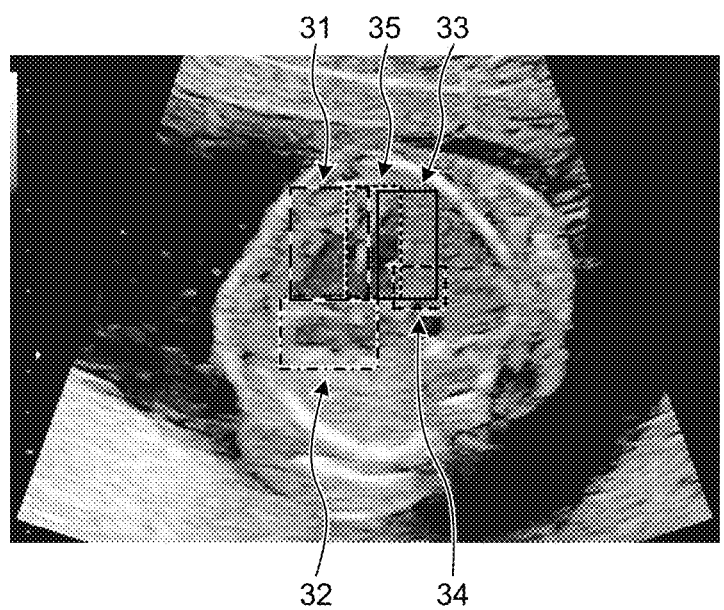
FIG. 11 is a diagram illustrating another exemplary result of sensing regions.

FIG. 11 is a diagram illustrating another exemplary result of sensing regions. FIG. 11 represents a result of sensing regions in No. 131 in FIG. 10. In No. 131, the right ventricle 31, the right atrium 32, the left ventricle 33, the left atrium 34 and the interventricular septum 35 are sensed but the crux of heart 36 is not sensed because there is a defect of the crux of heart 36. In other words, while the defect of the crux of heart 36 is read from the region sensing map 46, the defect is recognized also in the corresponding ultrasound examination image.

Figure 12:
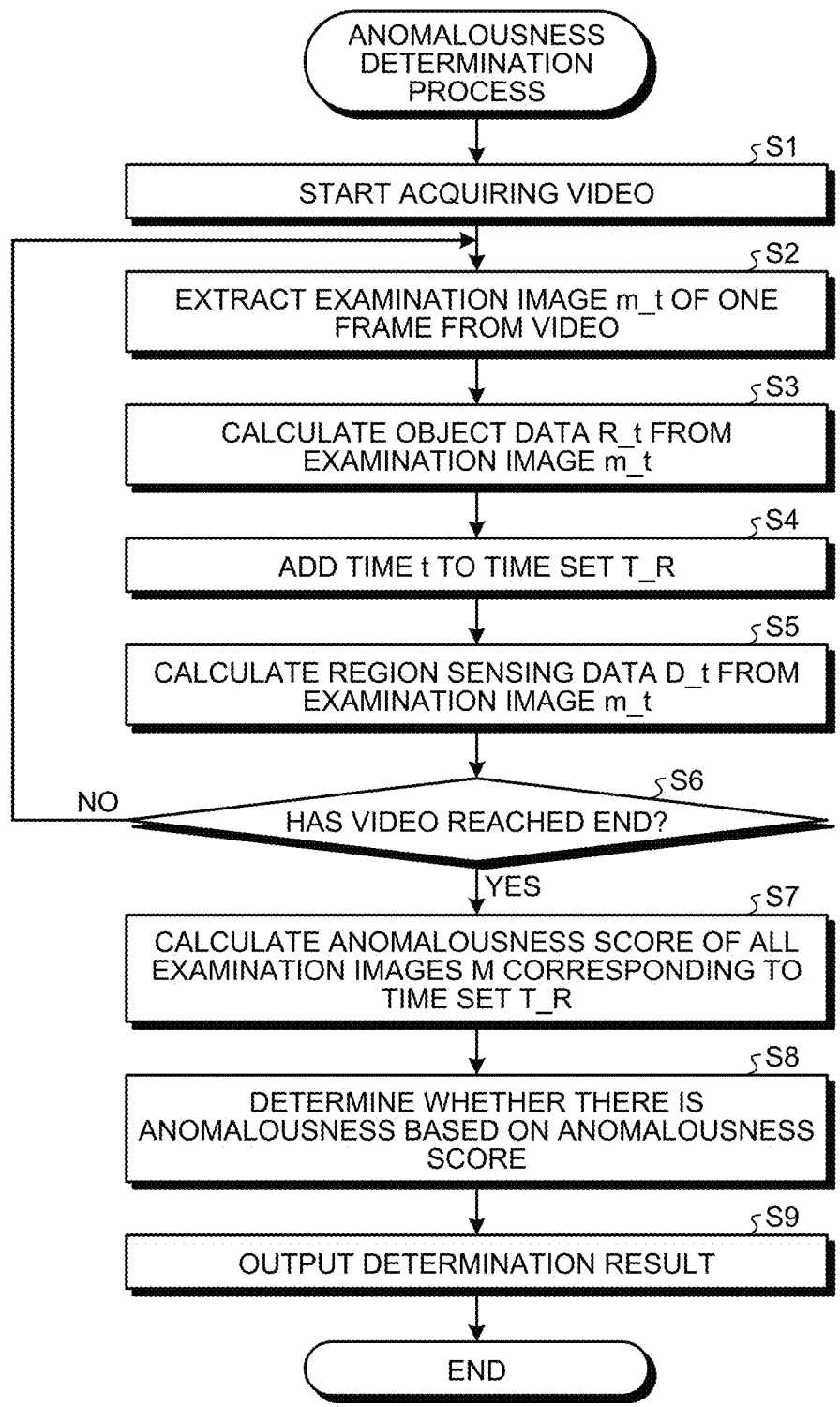
FIG. 12 is a flowchart of an exemplary anomalousness determination process of the first embodiment.

Operations of the anomalousness determination apparatus 100 of the first embodiment will be described. FIG. 12 is a flowchart illustrating an exemplary anomalousness determination process of the first embodiment.

When an instruction to start acquiring a video is issued to the acquisition unit 131, the acquisition unit 131 starts acquiring a video based on reception data that is received from the probe 110 (step S1). The acquisition unit 131 stores the acquired video in the image storage 121 and outputs the video to the first determination unit 132.

When the video is input from the acquisition unit 131 to the first determination unit 132, the first determination unit 132 extracts an examination image m_t of one frame from the input video (step S2). The first determination unit 132 calculates object data R_t from the extracted examination image m_t (step S3). When it is determined that a structure H (the heart) of an object that is a subject to be examined is imaged in the examination image m_t, the first determination unit 132 adds a time t to a time set T_R (step S4). The first determination unit 132 stores the calculated object data R_t and the time set T_R in the object data storage 122. The first determination unit 132 outputs the extracted examination image m_t to the sensor 133.

When the examination image m_t is input from the first determination unit 132 to the sensor 133, the sensor 133 refers to the learning model storage 123 and senses each element h (region) of the structure H (heart) of the object in the input examination image m_t using a learning model. In other words, the sensor 133 calculates region sensing data D_t from the examination image m_t (step S5). The sensor 133 stores the calculated region sensing data D_t in the region sensing data storage 124 and outputs an end determination instruction to the first determination unit 132.

When the end determination instruction is input from the sensor 133 to the first determination unit 132, the first determination unit 132 determines whether the video has reached the end (step S6). When it is determined that the video has not reached the end (NO at step S6), the first determination unit 132 increments the time t by one, that is, advances the video by one frame and returns to step S2. On the other hand, when it is determined that the video has reached the end (YES at step S6), the first determination unit 132 outputs a calculation instruction to the calculator 134.

When the calculation instruction is input from the first determination unit 132 to the calculator 134, the calculator 134 calculates an anomalousness score of all examination images M corresponding to the time set T_R (step S7). The calculator 134 stores the calculated anomalousness score in the anomalousness score storage 125 and outputs an anomalousness determination instruction to the second determination unit 135.

When the anomalousness determination instruction is input from the calculator 134 to the second determination unit 135, the second determination unit 135 refers to the anomalousness score storage 125 and determines whether there is anomalousness based on the anomalousness score (step S8). The second determination unit 135, for example, outputs a screen based on the determination result to the display unit 111 and causes the display unit 111 to display the screen (step S9). Thus, the anomalousness determination apparatus 100 is able to perform anomalousness determination based on the result of the ultrasound examination images. In other words, the anomalousness determination apparatus 100 is able to check whether the subject to be sensed is out of normality, that is, anomalous or has a defect. The anomalousness determination apparatus 100 is able to explicitly teach normal structures to the learning model, which enables learning with few sets of supervisory data and is robust to noise. The anomalousness determination apparatus 100 is able to focus on a given region in an object and determine anomalousness.

As described above, the anomalousness determination apparatus 100 performs anomalousness determination on an object using a plurality of ultrasound examination images of an object with a known structure. The anomalousness determination apparatus 100 senses regions in the object in each of the ultrasound examination images using the object sensing technique. The anomalousness determination apparatus 100 acquires a result of sensing the each of the regions in the object in each of the ultrasound examination images based on the sensing result and the structure of the object. The anomalousness determination apparatus 100 further determines anomalousness in the object based on the result of sensing each of the regions in the ultrasound examination images. As a result, the anomalousness determination apparatus 100 is able to perform anomalousness determination based on the result of the ultrasound examination images.

In the anomalousness determination apparatus 100, the ultrasound examination images are images on which it is determined that the object supposed to be imaged is imaged and that are thus selected. The anomalousness determination apparatus 100 then senses regions in the position where the object is supposed to be imaged, which enables improvement in sensing accuracy.

The anomalousness determination apparatus 100 determines anomalousness in the object based on a rate of detection of each of the regions in the ultrasound examination images. Accordingly, the anomalousness determination apparatus 100 is able to determine anomalousness of the regions.

The anomalousness determination apparatus 100 determines anomalousness in the object based on whether there is the object. Accordingly, the anomalousness determination apparatus 100 is able to determine a defect of a region.

In the anomalousness determination apparatus 100, the ultrasound examination images are images obtained by scanning an object. Accordingly, the anomalousness determination apparatus 100 is able to perform anomalousness determination on the internal structure of the object.

In the anomalousness determination apparatus 100, scanning is performed in a single direction. Accordingly, the anomalousness determination apparatus 100 is able to perform anomalousness determination on the internal structure of the object.

In the anomalousness determination apparatus 100, the ultrasound examination images are images that are selected such that the parts of return are not contained. Accordingly, the anomalousness determination apparatus 100 is able to improve sensing accuracy.

The anomalousness determination apparatus 100 detects anomalousness in the object with change over time. The anomalousness determination apparatus 100 detects change over time from frames in a video containing scan cross-sections of the object. The anomalousness determination apparatus 100 performs image recognition (object sensing) for detecting an object from each of the frames. The anomalousness determination apparatus 100 detects anomalousness in the object based on a degree of detection of the object in image recognition (object sensing) in frames where change over time is detected from among the frames. Accordingly, the anomalousness determination apparatus 100 is able to perform anomalousness determination based on the video containing the cross cross-sections of the object.

[b] Second Embodiment

In the first embodiment, the heart of a fetus is described as an exemplary subject to be examined, and any object on which ultrasound examination can be performed is usable and, for example, a semiconductor package may be a subject to be examined. An embodiment of such a case will be described as a second embodiment. The second embodiment differs from the anomalousness determination apparatus 100 of the first embodiment only in a subject to be examined and thus the subject to be examined will be described and description of the overlapping configurations and operations will be omitted.

In recent semiconductor packages, because of development in three-dimensional mount techniques, many chips (components) are often mounted on the same package, which is referred to as a SiP (System in Package). The internal structure of such a semiconductor package is complicated and thus checking not only internal flaw detection by related ultrasound examination but also mounting of the internal structure is needed.

Figure 13:
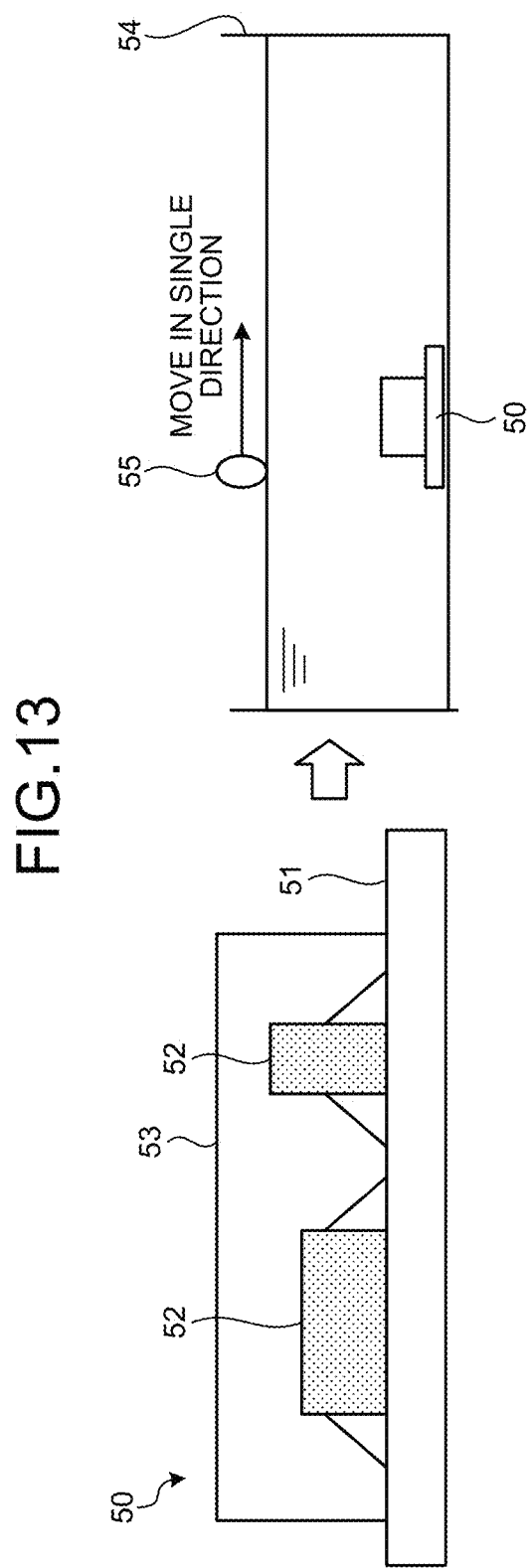
FIG. 13 is a diagram illustrating a subject to be examined and an examination method of a second embodiment.

FIG. 13 is a diagram illustrating an exemplary subject to be examined and an examination method of the second embodiment. A package 50 illustrated in FIG. 13 is an exemplary semiconductor package. In the package 50, a plurality of chips 2 are mounted on a substrate 51 and are sealed with a package resin 53. In the second embodiment, the package 50 is sunk in a tank 54 and a probe 55 is moved in parallel with the water surface of the tank 54 to acquire examination images.

In the second embodiment, the anomalousness determination apparatus 100 calculates object data R_t. In other words, in the second embodiment, the anomalousness determination apparatus 100 calculates types of components that are supposed to be imaged in an examination image m_t of a cross-section and a time t based on the design of the package 50 and the calculates the object data R_t. The anomalousness determination apparatus 100 further calculates a time set T_R per section where components are supposed to be imaged. Calculation of the object data R_t is the same as that in Example 1 and thus description thereof will be omitted.

Figure 14:
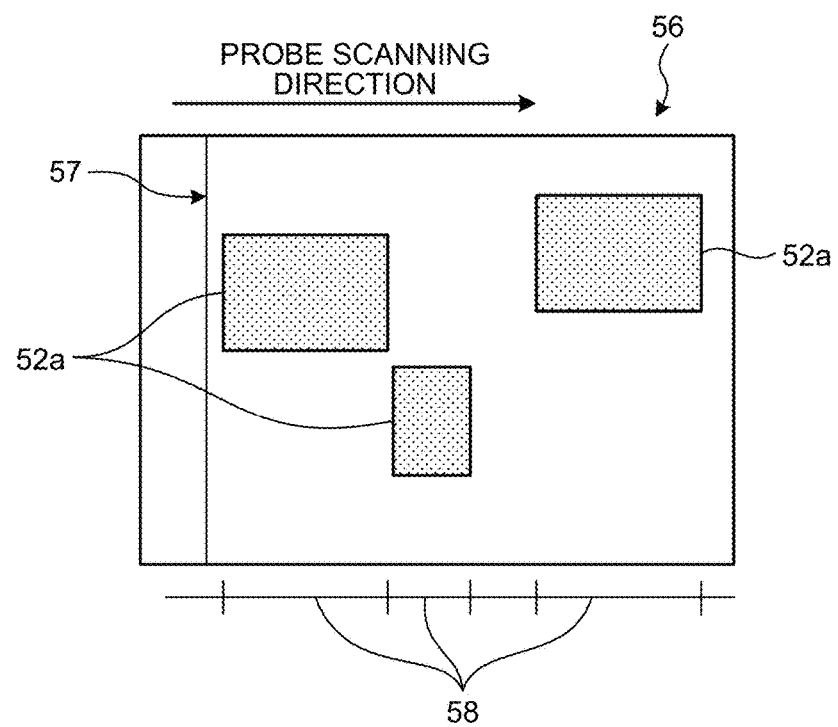
FIG. 14 is a diagram illustrating exemplary components that are supposed to be imaged.

FIG. 14 is a diagram illustrating exemplary components that are supposed to be imaged. Assume that, as illustrated in FIG. 114, there are a plurality of chips 52a as components that are supposed to be imaged on a plane view 56 of the package 50. In the second embodiment, the chips 52a supposed to be imaged are estimated respectively for sections 58 that are sectioned based on locations where the chips 52a appear in a cross-section 57 and locations where the chips 52a disappear from the cross-section 57 when the cross-section 57 is moved in the scanning direction. In other words, the time set T_R corresponds to the sections 58 where the respective chips 52a are supposed to be imaged.

The anomalousness determination apparatus 100 calculates region sensing data D_t from the examination image m_t. The anomalousness determination apparatus 100 calculates an anomalousness score of each chip 52a in all examination images M corresponding to the time set T_R and determines whether there is anomalousness. Calculation of the region sensing data D_t and calculation of an anomalousness score are the same as those in the first embodiment and thus description thereof will be omitted. As described above, even when the subject to be examined is a semiconductor package, the anomalousness determination apparatus 100 of the second embodiment is able to perform anomalousness determination based on the result of the ultrasound examination images.

In each of the above-described embodiments, an anomalousness score is calculated for a section where an object that is a subject to examined is supposed to be imaged in a video; however, embodiments are not limited thereto. For example, an anomalousness score may be calculated for all sections of the video. In this case, a section where the object that is the subject to be imaged is not supposed to be imaged corresponds to a difference between an empty set and an empty set and this thus does not affect the anomalousness score of a section where the object that is the subject to be examined is supposed to be imaged.

In each of the above-described embodiments, for the subject to be examined whose normal internal structure is known, the object sensing technique using machine learning is used for an ultrasound examination image is used to determine whether there is anomalousness. Accordingly, even when the accuracy of sensing an object in an ultrasound examination image is insufficient, it is possible to determine whether there is anomalousness.

In each of the embodiments, the scanning direction of the probe 110 is explained as a single direction; however, embodiments are not limited thereto. For example, a scanning direction may be specified by comparing each frame of a video and object data R_t and region sensing data D_T may be calculated from a set of examination images in a given area from which redundant frames are removed and an anomalousness score may be calculated from the set of examination images in the given area.

In the above-described embodiments, YOLO, SSD, Faster-RNN are exemplified as the object sensing algorithm; however, embodiments are not limited thereto. For example, an object sensing algorithm using various neural networks, such as DPM and Fast-RNN, are usable. As the learning method, in addition to back propagation, known methods can be employed. The neural network has a multistage configuration including, for example, an input layer, an intermediate layer (hidden layer), and an output layer and has a configuration in which a plurality of nodes are connected by edges. Each of the layers has a function referred to as "activating function", an edge has a "weight", and a value of each of the nodes is calculated from the value of the node of a previous layer, the value of the weight of the connecting edge, and an activation function of the layer. Note that, for the calculation method, known various methods can be employed. For machine learning, in addition to neural networks, various methods including SVM (support vector machine) may be used.

Each component of each unit need not necessarily be configured physically as illustrated in the drawings. In other words, specific modes of distribution and integration in each unit are not limited to those illustrated in the drawings and all or part of the components can be configured by being distributed and integrated physically or functionally in a given unit according to various loads and usage. For example, the calculator 134 and the second determination unit 135 may be integrated. The steps illustrated in the drawings are not limited to the above-described order and may be performed simultaneously or may be performed interchangeably as long as no inconsistency is caused in the process.

All or given part of various processing functions that are performed by each device may be implemented on a CPU (or a microcomputer, such as a MPU or a micro controller unit (MCU)). Needless to say, all or given part of the various functions may be executed on a program that is analyzed and executed by a CPU (or a microcomputer, such as a MPU or a MCU) or on hardware using a wired logic.

Figure 15:
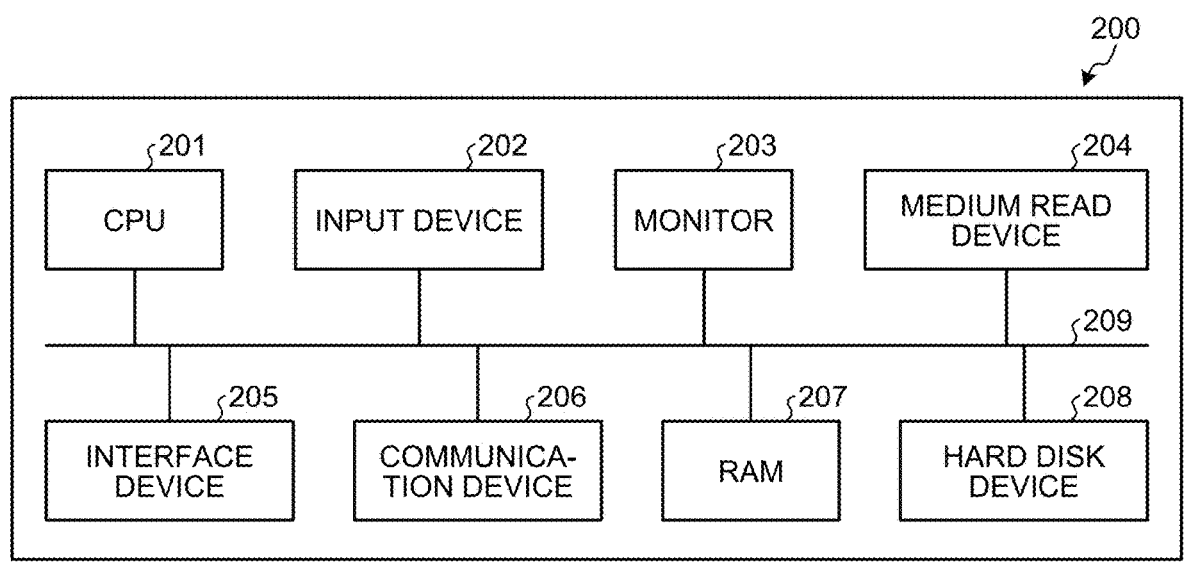
FIG. 15 is a diagram illustrating a computer that executes an anomalousness determination program.

Various processes that are described in the above-described embodiments can be realized by executing a program that is prepared in advance by a computer. An exemplary computer that executes a program having the same functions as those of each of the above-described embodiments will be described below. FIG. 15 is a diagram illustrating an exemplary computer that executes an anomalousness determination program.

As illustrated in FIG. 15, a computer 200 includes a CPU 201 that executes various types of computation, an input device 202 that receives data inputs, and a monitor 203. The computer 200 further includes a medium read device 204 that reads a program, etc., from a storage medium, an interface device 205 for connection with various devices, and a communication device 206 for wired or wireless connection with another information processing devices, etc. The computer 200 includes a RAM 207 that temporarily stores various types of information and a hard disk device 208. Each of the devices 201 to 208 is connected to a bus 209.

In the hard disk device 208, is stored an anomalousness determination program having the same functions as those of the processors that are the acquisition unit 131, the first determination unit 132, the sensor 133, the calculator 134, and the second determination unit 135. In the hard disk device 208, various types of data for implementing the image storage 121, the object data storage 122, the learning model storage 123, the region sensing data storage 124, the anomalousness score storage 125 and the anomalousness determination program are stored. The input device 202 receives inputs of various types of information, such as operation information from the user of the computer 200. The monitor 203, for example, displays various screens, such as a display screen, to the user of the computer 200. To the interface device 205, for example, a probe, etc., are connected. The communication device 206 is connected to a network (not illustrated in the drawings) and communicates various types of information with another information processing device.

The CPU 201 reads each of the programs stored in the hard disk device 208, loads the program into the RAM 207 and executes the program, thereby performing the various processes. The programs enable the computer 200 to function as the acquisition unit 131, the first determination unit 132, the sensor 133, the calculator 134, and the second determination unit 135.

The anomalousness determination program need not necessarily be stored in the hard disk device 208. For example, the computer 200 may read a program that is stored in a storage medium readable by the computer 200 and execute the program. The storage medium readable by the computer 200, for example, corresponds to a portable recording medium, such as a CD-ROM, a digital versatile disc (DVD) or a universal serial bus (USB) memory, a semiconductor memory, such as a flash memory, a hard disk drive, or the like. The anomalousness determination program may be stored in a device that is connected to a public line, the Internet, a LAN, or the like, and the computer 200 may read the anomalousness determination program from the device and execute the anomalousness determination program.

It is possible to perform anomalousness determination based on a result of ultrasound examination images.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein an anomalousness determination program that causes a computer to execute a process comprising:
   sensing a region in an object wherein a plurality of regions are included in a structure of the object and the object is supposed to be included in each of a plurality of ultrasound examination images using an object sensing technique, the sensed region being represented by a probability of a position of the region in the object, the object sensing technique being a learning model where the regions relating to the structure of the object are learned;
   based on the probability and the structure of the object, acquiring a rate of detection of each of the plurality of regions in the object; and
   determining anomalousness in the object based on the acquired rate of detection of each of the regions.

2. The non-transitory computer-readable recording medium according to claim 1, wherein the ultrasound examination images are images selected as determined to include the object.

3. The non-transitory computer-readable recording medium according to claim 1, wherein determining includes determining anomalousness in the object based on whether the object is sensed to exist in the ultrasound examination images.

4. The non-transitory computer-readable recording medium according to claim 1, wherein the ultrasound examination images are images obtained by scanning the object.

5. The non-transitory computer-readable recording medium according to claim 4, wherein the scanning is performed in a single direction.

6. The non-transitory computer-readable recording medium according to claim 4, wherein the ultrasound examination images are images that are selected such that parts of return of the scanning are not contained.

7. A non-transitory computer-readable recording medium storing therein an anomalousness determination program that causes a computer to execute a process comprising:
   detecting frames over a predetermined time period wherein the frames are scan cross-sections included in a video in which an object is supposed to be included and changes in pixel values of the frames over the predetermined time period are more than a predetermined threshold;
   performing image recognition for detecting regions included in a structure of the object in each of the detected frames, the image recognition using a learning model where the regions relating to the structure of the object are learned;
   acquiring a rate of detection of each of the regions in the object based on the image recognition and the structure of the object; and
   detecting anomalousness in the object based on the acquired rate of detection of each of the regions.

8. An anomalousness determination method comprising:
   sensing a region in an object wherein a plurality of regions are included in a structure of the object and the object is supposed to be included in each of a plurality of ultrasound examination images, using an object sensing technique, the sensed region being represented by a probability of a position of the region in the object, the object sensing technique being a learning model where the regions relating to the structure of the object are learned;

based on the sensing probability and the structure of the object, acquiring a rate of detection of each of the plurality of regions in the object; and determining anomalousness in the object based on the acquired rate of detection of each of the regions, by a processor.

9. An anomalousness determination method comprising:

detecting frames over a predetermined time period wherein the frames are scan cross-sections included in a video in which an object is supposed to be included and changes in pixel values of the frames over the predetermined time period are more than a predetermined threshold;

performing image recognition for detecting regions included in a structure of the object in each of the detected frames, the image recognition using a learning model where the regions relating to the structure of the object are learned;

acquiring a rate of detection of each of the regions in the object based on the image recognition and the structure of the object; and detecting anomalousness in the object based on the acquired rate of detection of each of the regions, by a processor.

10. An anomalousness determination apparatus comprising:

a processor configured to:

sense a region in an object wherein a plurality of regions are included in a structure of the object and the object is supposed to be included in each of a plurality of ultrasound examination images, using an object sensing technique, the sensed region being represented by a probability of a position of the region in the object, the object sensing technique being a learning model where the regions relating to the structure of the object are learned;

based on the probability and the structure of the object, acquire a rate of detection of each of the plurality of regions in the object; and determine anomalousness in the object based on the acquired rate of detection of each of the regions.

11. An anomalousness determination apparatus comprising:

a processor configured to:

detect frames over a predetermined time of period wherein the frames are scan cross-sections included in a video-an in which object is supposed to be included and changes in pixel values of the frames over the predetermined time period are more than a predetermined threshold;

perform image recognition for detecting regions included in a structure of the object in each of the detected frames, the image recognition using a learning model where the regions relating to the structure of the object are learned;

acquire a rate of detection of each of the regions in the object based on the image recognition and the structure of the object; and detect anomalousness in the object based on the acquired rate of detection of each of the regions.

* * * * *